US010429881B2

(12) United States Patent
Lee et al.

(10) Patent No.: US 10,429,881 B2
(45) Date of Patent: Oct. 1, 2019

(54) SEMICONDUCTOR DEVICE FOR STOPPING AN OSCILLATING CLOCK SIGNAL FROM BEING PROVIDED TO AN IP BLOCK, A SEMICONDUCTOR SYSTEM HAVING THE SEMICONDUCTOR DEVICE, AND A METHOD OF OPERATING THE SEMICONDUCTOR DEVICE

(71) Applicant: SAMSUNG ELECTRONICS CO., LTD., Suwon-si, Gyeonggi-Do (KR)

(72) Inventors: Min Joung Lee, Suwon-si (KR); Se Hun Kim, Yongin-si (KR); Jae Gon Lee, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 211 days.

(21) Appl. No.: 15/415,020

(22) Filed: Jan. 25, 2017

(65) Prior Publication Data

US 2017/0212551 A1 Jul. 27, 2017

Related U.S. Application Data

(60) Provisional application No. 62/286,866, filed on Jan. 25, 2016, provisional application No. 62/286,660, filed on Jan. 25, 2016.

(30) Foreign Application Priority Data

Jan. 3, 2017 (KR) .................. 10-2017-0000614
Jan. 24, 2017 (KR) .................. 10-2017-0010945

(51) Int. Cl.
*G06F 1/04* (2006.01)
*G06F 1/3203* (2019.01)
(Continued)

(52) U.S. Cl.
CPC .............. *G06F 1/04* (2013.01); *G06F 1/3203* (2013.01); *G06F 21/00* (2013.01); *G06F 21/71* (2013.01);
(Continued)

(58) Field of Classification Search
None
See application file for complete search history.

(56) References Cited

U.S. PATENT DOCUMENTS 5,373,293 A 12/1994 Hirata
5,655,127 A * 8/1997 Rabe ..................... G06F 1/3203
713/322

(Continued)

FOREIGN PATENT DOCUMENTS

JP 11-143570 5/1999
JP 2007-065756 3/2007

OTHER PUBLICATIONS

Notice of Allowance issued in corresponding application No. 15/415,162 dated Sep. 17, 2018.
(Continued)

*Primary Examiner* — Danny Chan
(74) *Attorney, Agent, or Firm* — F. Chau & Associates, LLC

(57) ABSTRACT

A semiconductor device includes a first clock control circuit for controlling a first clock source; a second clock control circuit for sending a first clock request to the first clock control circuit in response to a block clock request from an intellectual property (IP) block, and controlling a second clock source, which receives a clock signal from the first clock source, to generate a stopped clock signal, which is a clock signal turned off for a predetermined amount of time; and a driver circuit for receiving a block control signal, and
(Continued)

outputting the block control signal to the IP block while the short stopped clock signal is output to the IP block.

20 Claims, 16 Drawing Sheets

(51) Int. Cl.
  *G06F 21/00*    (2013.01)
  *G06F 21/71*    (2013.01)
(52) U.S. Cl.
  CPC ............... *G06F 2221/2137* (2013.01); *G06F 2221/2151* (2013.01)

(56) References Cited

U.S. PATENT DOCUMENTS

| | | | |
|---|---|---|---|
| 5,793,993 A | 8/1998 | Broedner | |
| 5,978,930 A | 11/1999 | Furuta et al. | |
| 6,021,501 A | 2/2000 | Shay | |
| 6,437,617 B2 | 8/2002 | Saeki | |
| 6,654,898 B1 * | 11/2003 | Bailey | G06F 1/06 713/500 |
| 6,915,438 B2 | 7/2005 | Boros | |
| 6,927,604 B2 | 8/2005 | Boerstler et al. | |
| 7,111,183 B1 | 9/2006 | Klein et al. | |
| 7,142,478 B2 | 11/2006 | Suh | |
| 7,174,467 B1 * | 2/2007 | Helms | G06F 1/3228 713/300 |
| 7,245,161 B2 | 7/2007 | Boerstler et al. | |
| 7,694,042 B2 | 4/2010 | Lee et al. | |
| 8,140,925 B2 | 3/2012 | Bellofatto et al. | |
| 8,375,239 B2 | 2/2013 | Nara et al. | |
| 8,826,047 B1 | 9/2014 | Zhu et al. | |
| 8,996,906 B1 | 3/2015 | Townley et al. | |
| 9,081,517 B2 | 7/2015 | Koniaris et al. | |
| 9,383,805 B2 * | 7/2016 | Jouin | G06F 1/3237 |
| 9,766,648 B2 | 9/2017 | Hashim et al. | |
| 2002/0152407 A1 * | 10/2002 | Alia | G06F 1/3203 713/300 |
| 2004/0153678 A1 | 8/2004 | Ahmad et al. | |
| 2004/0243874 A1 | 12/2004 | Byers et al. | |
| 2005/0232218 A1 | 10/2005 | Edwards et al. | |
| 2006/0161797 A1 * | 7/2006 | Grass | G06F 1/08 713/400 |
| 2006/0248367 A1 * | 11/2006 | Fischer | G06F 1/12 713/401 |
| 2009/0150706 A1 | 6/2009 | Oh et al. | |
| 2011/0050300 A1 | 3/2011 | Klapproth et al. | |
| 2011/0239021 A1 * | 9/2011 | Vedder | G06F 1/263 713/323 |
| 2013/0055004 A1 | 2/2013 | Koniaris et al. | |
| 2013/0173951 A1 | 7/2013 | Vogel | |
| 2014/0082396 A1 * | 3/2014 | Vahidsafa | G06F 1/12 713/400 |
| 2014/0266333 A1 | 9/2014 | Jouin et al. | |
| 2016/0116934 A1 * | 4/2016 | Ha | G06F 1/04 327/298 |

OTHER PUBLICATIONS

U.S. Office Action issued in corresponding U.S. Appl. No. 15/414,819 dated Aug. 28, 2018.
U.S. Office Action issued in corresponding application No. 15/415,041 dated Jul. 5, 2018.

* cited by examiner

1200

1300

1400

SEMICONDUCTOR DEVICE FOR STOPPING AN OSCILLATING CLOCK SIGNAL FROM BEING PROVIDED TO AN IP BLOCK, A SEMICONDUCTOR SYSTEM HAVING THE SEMICONDUCTOR DEVICE, AND A METHOD OF OPERATING THE SEMICONDUCTOR DEVICE

CROSS-REFERENCE TO RELATED APPLICATIONS

This application claims priority to U.S. Provisional Patent Application No. 62/286,866 filed on Jan. 25, 2016 in the United States Patent and Trademark Office and Korean Patent Application No. 10-2017-0000614 filed on Jan. 3, 2017 in the Korean Intellectual Property Office, the disclosures of which are incorporated by reference herein in their entireties.

This application also claims priority to U.S. Provisional Patent Application No. 62/286,860 filed on Jan. 25, 2016 in the United States Patent and Trademark Office and Korean Patent Application No. 10-2017-0010945 filed on Jan. 24, 2017 in the Korean Intellectual Property Office, the disclosures of which are incorporated by reference herein in their entireties.

TECHNICAL FIELD

The present inventive concept relates to a semiconductor device, a semiconductor system, and a method of operating the semiconductor device.

DESCRIPTION OF THE RELATED ART

A system-on-chip (SOC) may include one or more intellectual property (IP) blocks, a clock management unit (CMU), and a power management unit (PMU). The CMU provides a clock signal to the IP blocks. The CMU may not provide the clock signal to an IP block that is not in operation, thereby reducing the waste of resources in a system that employs the SOC.

To control the provision of the clock signal, various clock sources included in the CMU, such as, for example, a multiplexer (MUX) circuit, a clock dividing circuit, a short stop circuit, and a clock gating circuit, may be controlled by software using a special function register (SFR). However, the control of the clock sources included in the CMU using software may be slow.

SUMMARY

According to an exemplary embodiment of the present inventive concept, there is provided a semiconductor device including a first clock control circuit for controlling a first clock source; a second clock control circuit for sending a first clock request to the first clock control circuit in response to a block clock request from an intellectual property (IP) block, and controlling a second clock source, which receives a clock signal from the first clock source, to generate a stopped clock signal, which is a clock signal turned off for a predetermined amount of time; and a driver circuit for receiving a block control signal, and outputting the block control signal to the IP block while the stopped clock signal is output to the IP block.

According to an exemplary embodiment of the present inventive concept, there is provided a semiconductor device including a first clock control circuit for controlling a first clock source; a second clock control circuit for sending a first clock request to the first clock control circuit in response to a block clock request from an IP block, and controlling a second clock source, which receives a clock signal from the first clock source, to generate a stopped clock signal, which is a clock signal turned off for a predetermined amount of time; and a driver circuit for sending a second clock request to the second clock circuit and a third clock request to the second clock source in response to a block control signal.

According to an exemplary embodiment of the present inventive concept, there is provided a semiconductor system including a system-on-chip (SoC) including at least one IP block and a clock management unit (CMU), which provides a clock signal to the at least one IP block; and at least one external device electrically connected to the SoC, wherein the CMU includes a first clock control circuit for controlling a first clock source, a second clock control circuit for sending a first clock request to the first clock control circuit in response to a block clock request from the at least one IP block, and controlling a second clock source, which receives a clock signal from the first clock source, to generate a stopped clock signal, which is a clock signal turned off for a predetermined amount of time, and a driver circuit for receiving a block control signal, and outputting the block control signal to the at least one IP block while the stopped clock signal is output to the at least one IP block.

According to an exemplary embodiment of the present inventive concept, there is provided a method of operating a semiconductor device including receiving a first clock request from a driver circuit, which outputs a block control signal to the IP block, wherein the first clock request is initiated in response to a block control signal; sending a second clock request to a parent clock control circuit, which controls a parent clock source, in response to the first clock request; receiving an acknowledgement for the second clock request from the parent clock control circuit and sending an acknowledgement for the second clock request to the driver circuit; receiving a third clock request from the driver circuit; generating a stopped clock signal, which is a clock signal turned off for a predefined amount of time, in response to the third clock request; and sending an acknowledgement for the third clock request to the driver circuit.

According to an exemplary embodiment of the present inventive concept, there is provided a clock control circuit and a clock source; and a driver circuit configured to send a first clock request signal at a first time to the clock control circuit, receive an acknowledgement of the first clock request at a second time, send a second clock request at a third time to the clock source, and receive an acknowledgement of the second clock request at a fourth time, wherein the clock source is configured to generate a first clock signal in response to the second clock request, wherein the first clock signal does not oscillate between a high and a low state, and wherein the driver circuit is further configured to terminate the second clock request at a fifth time and, in response to the second clock request, the first clock signal is disabled.

BRIEF DESCRIPTION OF THE DRAWINGS

The above and other features of the present inventive concept will become more apparent by describing in detail exemplary embodiments thereof with reference to the attached drawings, in which.

DETAILED DESCRIPTION OF THE EMBODIMENTS

Figure 1:
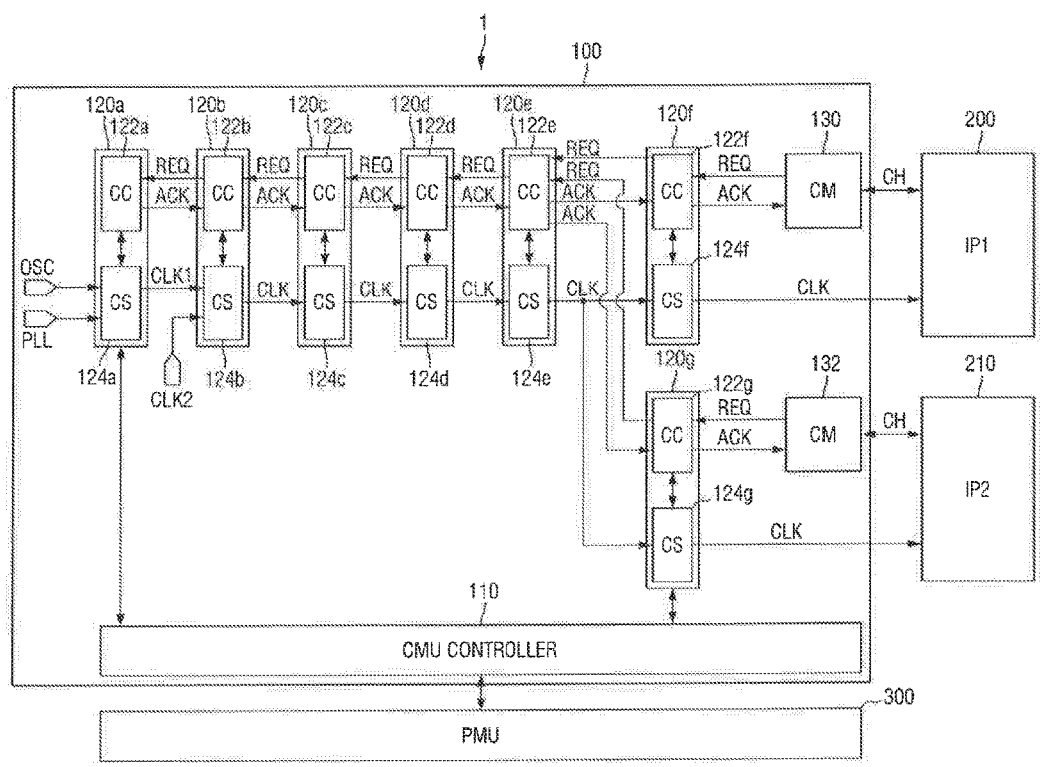
FIG. 1 is a schematic view illustrating a semiconductor device according to an exemplary embodiment of the present inventive concept.

FIG. 1 is a schematic view illustrating a semiconductor device according to an exemplary embodiment of the present inventive concept.

Referring to FIG. 1, a semiconductor device 1 includes a clock management unit (CMU) 100, intellectual property (IP) blocks 200 and 210, and a power management unit (PMU) 300. The semiconductor device 1 may be a system-on-chip (SoC), but the present inventive concept is not limited thereto.

The CMU 100 provides a clock signal to the IP blocks 200 and 210. The CMU 100 includes clock components 120a through 120g, channel management circuits 130 and 132, and a CMU controller 110. The clock components 120a through 120g generate a clock signal to be provided to the IP blocks 200 and 210. The channel management circuits 130 and 132, which are disposed between the clock components 120f and 120g, respectively, and the IP blocks 200 and 210, respectively, provide a communication channel CH between the IP blocks 200 and 210. The CMU controller 110 provides a clock signal to the IP blocks 200 and 210 by using the clock components 120a through 120g.

In an exemplary embodiment of the present inventive concept, the communication channel CH, which is provided by the channel management circuits 130 and 132, may conform to a Q-channel interface or a P-channel interface as defined in the ARM® Low Power Interface (LPI) Specification, but the present inventive concept is not limited thereto. In other words, the communication channel CH may conform to an arbitrary communication protocol depending on how the semiconductor device 1 is to be implemented.

The clock components 120a through 120g may include clock sources 124a through 124g, respectively, and clock control circuits 122a through 122g, respectively. The clock control circuits 122a through 122g respectively control the clock sources 124a through 124g. Examples of the clock sources 124a through 124g include multiplexer (MUX) circuits, clock dividing circuits, short stop circuits, and clock gating circuits.

The clock components 120a through 120g may have a parent-child relationship with one another. For example, the clock component 120a is the parent of the clock component 120b, and the clock component 120b is a child of the clock component 120a and the parent of the clock component 120c. The clock component 120e is the parent of the clock components 120f and 120g, and the clock components 120f and 120g are children of the clock component 120e. The clock component 120a, which is disposed closest to a phase locked loop (PLL), is a root clock component, and the clock components 120f and 120g, which are disposed closest to the IP blocks 200 and 210, are leaf clock components. Since the clock components 120a through 120g have a parent-child relationship with one another, the clock control circuits 122a through 122g may also have a parent-child relationship with one another, and the clock sources 124a through 124g may also have a parent-child relationship with one another.

The clock control circuits 122a through 122g may exchange a clock request REQ and an acknowledgement ACK with one another and may provide a clock signal to the IP blocks 200 and 210.

For example, in a case in which the IP block 200 does not need a clock signal, the CMU 100 may stop providing a clock signal to the IP block 200. An example of a case in which the IP block 200 does not need clock is when the IP block 200 is going to be placed in a sleep state.

For example, the channel management circuit 130 may transmit a first signal indicating that a clock signal is to be stopped being provided to the IP block 200 under the control of the CMU 100 or the CMU controller 110. In response to the receipt of the first signal, the IP block 200 transmits a second signal indicating that a clock signal is not going to be provided after completing a task currently being performed to the channel management circuit 130. In response to the receipt of the second signal from the IP block 200, the channel management circuit 130 requests its parent, e.g., the clock component 120f, to stop providing a clock signal.

For example, in a case in which the communication channel CH, which is provided by the channel management circuit 130, conforms to a Q-channel interface, the channel management circuit 130 sends a "QREQn" signal having a first logic value (e.g., a logic low level 'L') to the IP block 200 as the first signal. Thereafter, the channel management circuit 130 receives a "QACCEPTn" signal having the first logic value from the IP block 200 as the second signal and sends a clock request REQ having, for example, the first logic value, to the clock component 120f. In this example, the clock request REQ having the first logic value may be a "clock provision termination request".

In response to the receipt of the clock request REQ having the first logic value, e.g., the clock provision termination request, from the channel management circuit 130, the clock control circuit 122f stops providing a clock signal by disabling the clock source 124f (e.g., a clock gating circuit). As a result, the IP block 200 may enter a sleep mode. In this process, the clock control circuit 122f may provide an acknowledgement ACK having the first logic value to the channel management circuit 130. However, receipt of the acknowledgement ACK having the first logic value for the clock provision termination request by the clock management circuit 130 does not necessarily guarantee that a clock signal will stop being provided from the clock source 124f. This is so, because the receipt of the acknowledgement ACK having the first logic value just means that the clock control circuit 122f recognizes that the clock component 120f, which is the parent of the channel management circuit 130, no longer needs to provide a clock signal to the channel management circuit 130.

In addition, the clock control circuit 122f of the clock component 120f sends the clock request REQ having the first logic value to its parent, e.g., the clock control circuit 122e of the clock component 120e. If the IP block 210 does not need a clock signal, for example, if the clock control circuit 122e receives the clock provision termination request from the clock control circuit 122g, the clock control circuit 122e disables the clock source 124e (e.g., a clock dividing circuit), thereby stopping the provision of a clock signal. As a result, the IP blocks 200 and 210 may both enter the sleep mode.

The aforementioned operation performed by the clock control circuit 122f may also be performed by other clock control circuits, for example, the clock control circuits 122a through 122d.

Further, in a case in which the clock control circuit 122f of the clock component 120f sends the clock request REQ having the first logic value to its parent, e.g., the clock control circuit 122e of the clock component 120e, and the IP block 210 is in a run mode, the clock control circuit 122e cannot disable the clock source 124e. This is so, because the clock control circuit 122e can disable the clock source 124e and send the clock request REQ having the first logic value to its parent, e.g., the clock control circuit 120d, only when the IP block 210 does not need a clock signal. In other words, the clock control circuit 122e can disable the clock source 124e only after the receipt of the clock provision termination request from both of its children, e.g., the clock control circuits 122f and 122g.

When the clock sources 124a through 124f are all disabled because the IP blocks 200 and 210 are in the sleep mode, and then, the IP block 200 is placed into the run mode, the CMU 100 may resume providing a clock signal to the IP blocks 200 and 210.

The channel management circuit 130 sends a clock request REQ having a second logic value (for example, a logic high level 'H') to its parent, e.g., the clock control circuit 122f of the clock component 120f, and waits for an acknowledgement ACK to be received from the clock control circuit 122f. Here, the clock request REQ having the second logical value may be a "clock provision request", and the receipt of an acknowledgement ACK for the clock provision request means that the provision of a clock signal from the clock source 124f has been resumed. The clock control circuit 122f cannot immediately enable the clock source 124f (e.g., a clock gating circuit); rather, the clock control circuit 122f waits for a clock signal to be provided from its parent.

Thereafter, the clock control circuit 122f sends the clock request REQ having the second logic value, e.g., the clock provision request, to its parent, e.g., the clock control circuit 122e, and waits for an acknowledgement ACK to be received from the clock control circuit 122e. The aforementioned operation performed by the clock control circuit 122f may be performed by other clock control circuits, for example, the clock control circuits 122a through 122d.

In response to the receipt of the clock request REQ having the second logic value from the clock control circuit 122b, the clock control circuit 122a, which is the root clock component, enables the clock source 124a (e.g., a MUX circuit) and sends an acknowledgement ACK to the clock control circuit 122b. In this way, the clock sources 124b through 124e are sequentially enabled, and then, the clock control circuit 122e sends an acknowledgement ACK indicating that the provision of a clock signal from the clock source 124e has been resumed to the clock control circuit 122f. In response to the receipt of the acknowledgement ACK sent by the clock control circuit 122e, the clock control circuit 122f enables the clock source 124f to provide a clock signal to the IP block 200 and provides an acknowledgement ACK to the channel management circuit 130.

The clock control circuits 122a through 122g may be operated in a full handshake manner by exchanging a clock request REQ and an acknowledgement ACK signal with one another. Accordingly, the clock control circuits 122a through 122g can control the provision of a clock signal to the IP blocks 200 and 210 by controlling the clock sources 124a through 124g. In other words, the control of the clock sources 124a through 124g in the CMU 100 is done via hardware.

The clock control circuits 122a through 122g may be driven to transmit a clock request REQ to their respective parents or to respectively control the clock sources 124a through 124g. In addition, the clock control circuits 122a through 122g may be operated under the control of the CMU controller 110. In an exemplary embodiment of the present inventive concept, the clock control circuits 122a through 122g may include finite state machines (FSMs), which control the clock sources 124a through 124g according to clock requests REQ transmitted among the clock control circuits 122a through 122g.

In an embodiment, the clock component 120a is implemented by a phase-locked loop (PLL) controller. In an embodiment, the PLL controller receives from an oscillator OSC, a constant or variable frequency signal oscillated by the oscillator OSC and a PLL signal output by a PLL, and outputs one of the two received signals based on a certain condition. When the components need the PLL signal, the PLL controller outputs the PLL signal. When the components need the oscillator signal, the PLL controller outputs the oscillator signal. For example, the PLL controller can be implemented using a ring oscillator or a crystal oscillator. In an embodiment, the clock component 120b is a clock multiplexer unit that receives a first clock signal CLK1 from the first clock component 120a and a second clock signal CLK2 from an external source (e.g., an external CMU).

Figure 2:
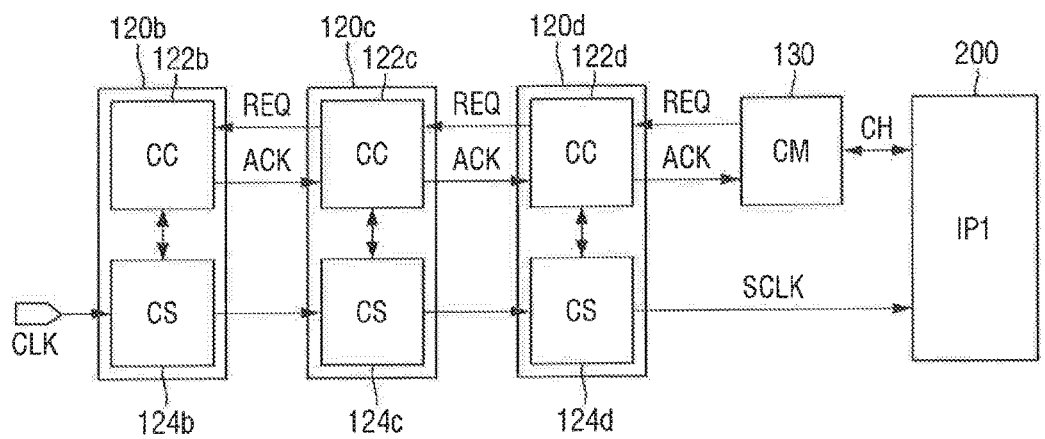
FIG. 2 is a schematic view illustrating the semiconductor device of FIG. 1.

FIG. 2 is a schematic view illustrating the semiconductor device of FIG. 1.

Referring to FIG. 2, the clock component 120c generates a short stopped clock signal SCLK. The short stopped clock signal SCLK is a clock signal CLK that is turned off for a predetermined amount of time, but will be turned on after the lapse of the predetermined amount of time. In other words, at the end of the predetermined time, the short stopped clock signal SCLK is turned on. The term "short stopped," as used herein, may mean that the short stopped clock signal SCLK that is once turned off is always turned on after the lapse of the predetermined amount of time, even if no particular event occurs. The length of the period for which the short stopped clock signal SCLK is turned off may vary. In an exemplary embodiment of the present inventive concept, the length of the period for which the short stopped clock signal SCLK is turned off may be set, for example, by software.

The short stopped clock signal SCLK may be used in cases when a predetermined signal (e.g., an asynchronous or synchronous reset signal) is to be input to, for example, the IP block 200. In addition, the short stopped clock signal SCLK may be used in cases when there is a signal whose timing may not easily be matched to a short clock cycle period (for example, a period of one clock cycle or several clock cycles) because of its short propagation delay. The short stopped clock signal SCLK may also be used in a case when a control signal is to be provided, for example, to the IP block 200, to prevent a glitch while ensuring that the IP block 200 is in an idle state. In an exemplary embodiment of the present inventive concept, the clock component 120c includes a clock control circuit 122c and a clock source 124c, which is controlled by the clock control circuit 122c. The clock source 124c receives the clock signal CLK, and outputs the short stopped clock signal SCLK.

As described above with reference to FIG. 1, the clock component 120c, which generates the short stopped clock signal SCLK, provides the short stopped clock signal SCLK while exchanging a clock request REQ and an acknowledgement ACK with other clock components (e.g., the clock components 120b and 120d). The clock components 120b and 120d may be clock components having an arbitrary function. For example, the clock components 120b and 120d may be dividing circuits for dividing the clock signal CLK, but the present inventive concept is not limited thereto. The clock component 120c, which generates the short stopped clock signal SCLK, may be disposed at any location in a clock tree including a plurality of clock components, except for the location of the root clock component 120a. The location of the clock component 120c may depend on the implementation purpose of the semiconductor device 1.

For example, to generate the short stopped clock signal SCLK at an appropriate timing when a predetermined signal (such as an asynchronous or synchronous reset signal) is to be input, for example, to the IP block 200, the clock component 120c not only detects when the value of the predetermined signal changes, but also determines when to turn on or off the clock signal CLK.

Figure 3:
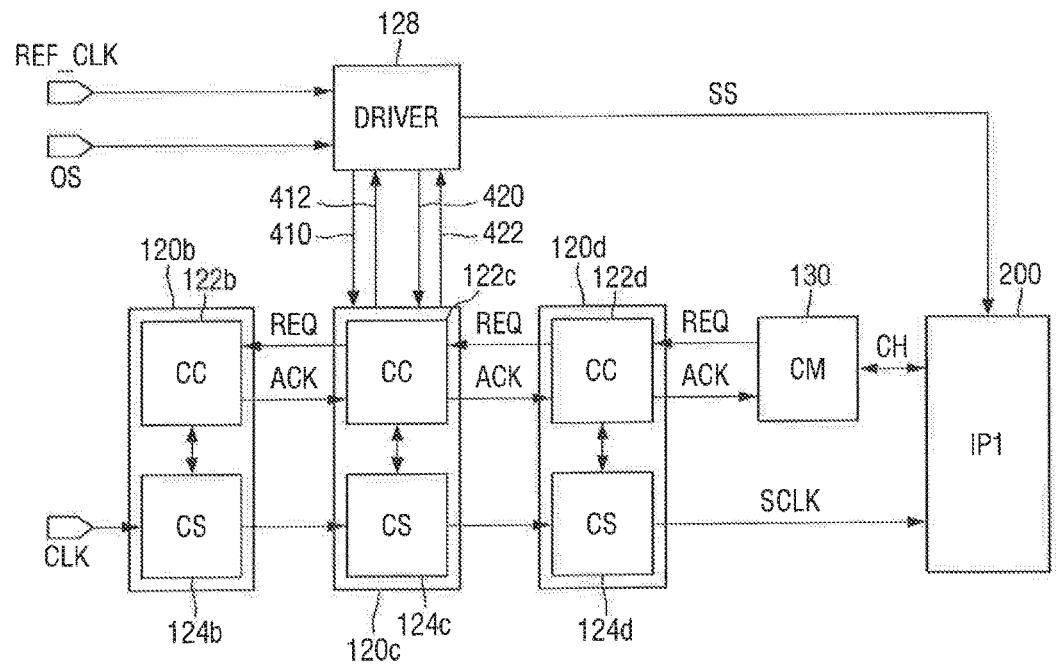
FIG. 3 is a schematic view illustrating a semiconductor device according to an exemplary embodiment of the present inventive concept.

FIG. 3 is a schematic view illustrating a semiconductor device according to another exemplary embodiment of the present inventive concept.

Referring to FIG. 3, the semiconductor device further includes a driver circuit 128.

The driver circuit 128 receives an IP block control signal OS, which controls an IP block 200, and outputs an IP block control signal SS to the IP block 200 while a clock control circuit 122c is outputting a short stopped clock signal SCLK to the IP block 200. In other words, the IP block control signal SS is an IP block control signal OS input to the IP block 200 according to the timing of the short stopped clock signal SCLK. In an exemplary embodiment of the present inventive concept, examples of the IP block control signal OS or SS include a reset signal, an isolation signal, and an extra-margin adjustment (EMA) signal for a memory device, but the present inventive concept is not limited thereto. In other words, examples of the IP block control signal OS or SS also include any arbitrary signal used in cases when a predetermined signal (such as an asynchronous or synchronous reset signal) is to be input to the IP block 200, when there is a signal whose timing may not be easily matched to a short clock cycle period (for example, one clock cycle or several clock cycles) because of its short propagation delay, and when a control signal is to be provided to the IP block 200, to prevent a glitch while ensuring that the IP block 200 is in an idle state.

The driver circuit 128 detects the input of the IP block control signal OS and sends a clock request 410 to the clock control circuit 122c. To provide the short stopped clock signal SCLK to the IP block 200, a clock signal CLK for the parent of the clock control circuit 122c, e.g., a clock control circuit 122b, is to be turned on first. Thus, the clock control circuit 122c receives the clock request 410, and then, sends a clock request REQ to the clock control circuit 122b, thereby allowing a clock source 124c to receive the clock signal CLK from its parent, e.g., a clock source 124b. The clock control circuit 122c receives an acknowledgement ACK from the clock control circuit 122b and sends an acknowledgement 412 for the clock request REQ (clock request 410) to the driver circuit 128. The acknowledgement 412 for the clock request REQ indicates that an on-state clock signal is being provided from the clock source 124b, which is controlled by the parent of the clock control circuit 122c. e.g., the clock control circuit 122b, to the clock source 124c.

The driving circuit 128 receives the acknowledgement 412 for the clock request 410 from the clock control circuit 122c, and sends a clock request 420 to the clock source 124c after ensuring that the clock signal CLK has an "on" state. The clock source 124c receives the clock request 420, and sends an acknowledgement 422 for the clock request 420 to the driver circuit 128 while outputting the short stopped clock signal SCLK.

Accordingly, the driver circuit 128 outputs the IP block control signal SS to the IP block 200 according to the timing of the short stopped clock signal SCLK, which is generated by the clock source 124c. The driver circuit 128 may terminate clock gating for the short stopped clock signal SCLK by cancelling the clock request 420 a predetermined amount of time after the output of the IP block control signal SS to the IP block 200.

In an exemplary embodiment of the present inventive concept, the driver circuit 128 may be an IP block such as the IP block 200, in which case, the driver circuit 128 is driven by a reference clock signal REF_CLK, which is a clock signal for self-operation. Thus, the driver circuit 128 may send a request to a CMU 100 to provide the reference clock signal REF_CLK or to stop providing the reference clock signal REF_CLK. In other words, the reference clock signal REF_CLK provided to the driver circuit 128 and the clock signal CLK provided to the IP block 200 may be different signals.

As described above, by providing the driver circuit 128 separately from the elements of the CMU 100, a first path for detecting the input of the IP block control signal OS and controlling the clock control circuit 122c and a second path for providing the clock signal CLK to the IP block 200 via the clock sources 124b, 124c, and 124d can be separated from each other. As a result, the length of the propagation path of the clock signal CLK can be minimized, and a jitter effect can be reduced.

Figure 4:
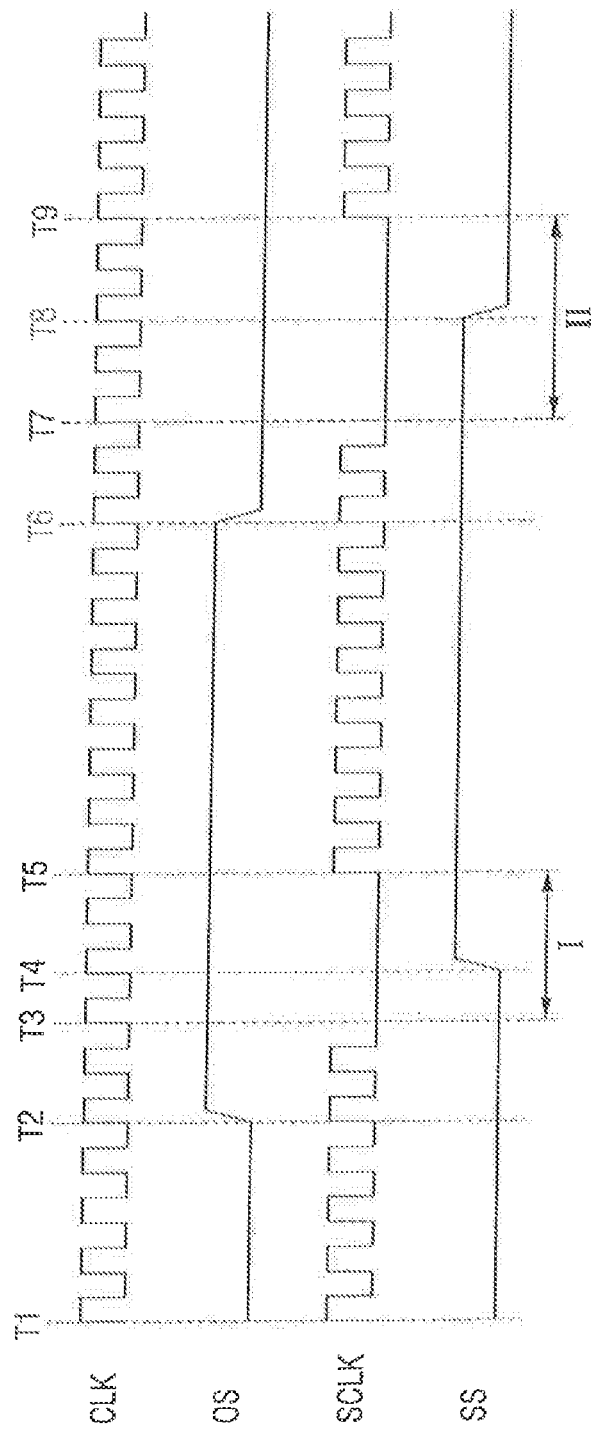
FIG. 4 is a timing diagram illustrating an operation of the semiconductor device of FIG. 3 according to an exemplary embodiment of the present inventive concept.

FIG. 4 is a timing diagram illustrating an operation of the semiconductor device of FIG. 3 according to an exemplary embodiment of the present inventive concept.

Referring to FIG. 4, at a time T2, the driver circuit 128 detects the input of the IP block control signal OS. Thereafter, at a time T3, the driver circuit 128 sends the clock request 410 to the clock control circuit 122c to ensure that the clock source 124c receives the clock signal CLK from its parent, e.g., the clock source 124b, and sends the clock request 420 to the clock source 124c so that the clock source 124c generates the short stopped clock signal SCLK.

The driving circuit 128 outputs the IP block control signal SS to the IP block 200 during the output of the short stopped clock signal SCLK in a period I between the time T3 and a time T5.

In response to the detection of a change in the value of the IP block control signal OS at a time T6 (e.g., when OS goes from high to low), at a time 17, the driver circuit 128 sends the clock request 410 again to the clock control circuit 122c to ensure that the clock source 124c receives the clock signal CLK from its parent, e.g., the clock source 124b, and sends the clock request 420 again to the clock source 124c so that the clock source 124c generates the short stopped clock signal SCLK.

The driving circuit 128 outputs the IP block control signal SS whose value is changed to the IP block 200 during the output of the short stopped clock signal SCLK in a period II between the time T7 and a time T9.

Figure 5:
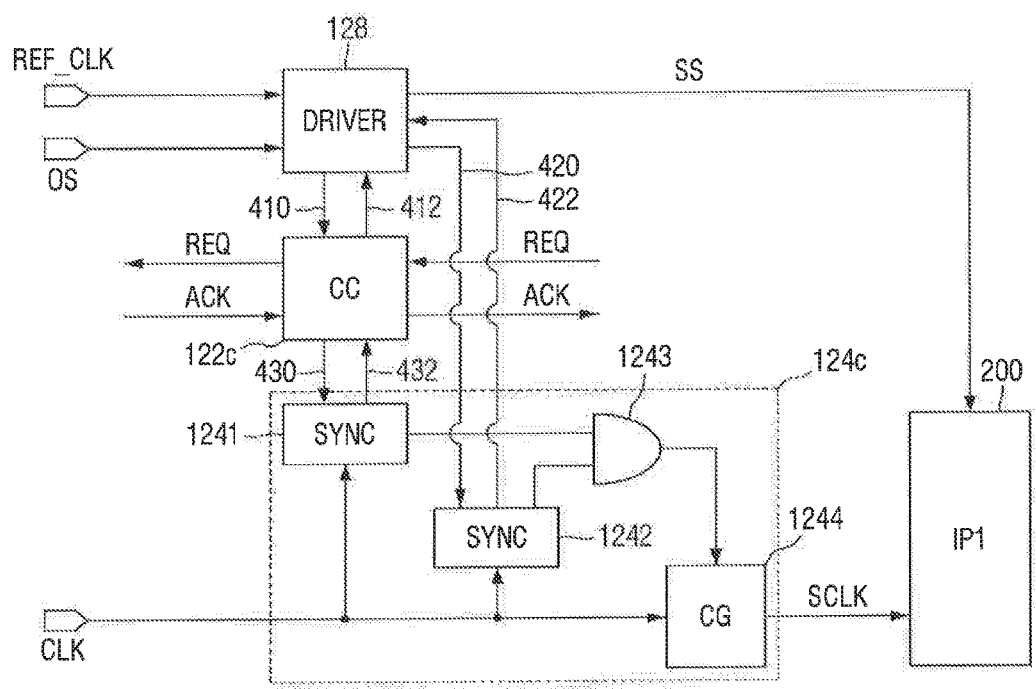
FIG. 5 is a schematic view illustrating a semiconductor device according to an exemplary embodiment of the present inventive concept.

FIG. 5 is a schematic view illustrating a semiconductor device according to an exemplary embodiment of the present inventive concept.

Referring to FIG. 5, a clock source 124c may include a clock gating circuit 1244. The clock gating circuit 1244 receives a clock signal CLK and gates and outputs the clock signal CLK according to an enable signal. In other words, a short stopped clock signal SCLK may be generated by driving the clock gating circuit 1244 in response to the enable signal, which is provided from a clock control circuit 122c and a driver circuit 128.

The clock source 124c further includes a logic gate 1243, which performs a logical operation on a first enable signal 430 received from the clock control circuit 122c and a second enable signal 420 received from the driver circuit 128 to generate a signal for controlling the clock gating circuit 1244.

The logic gate 1243 is illustrated in FIG. 5 as an AND logic gate, but the present inventive concept is not limited thereto. In other words, the logic gate 1243 may be an arbitrary logic gate that receives the first enable signal 430 and the second enable signal 420 and outputs a signal for controlling the clock gating circuit 1244.

For example, the first enable signal 430, which is received from the clock control circuit 122c, is synchronized with a clock signal CLK by a synchronization circuit 1241, and the second enable signal 420, which is received from the driver circuit 128, is synchronized with the clock signal CLK by a synchronization circuit 1242. The first enable signal 430 synchronized with the clock signal CLK and the second enable signal 420 synchronized with the clock signal CLK may be input to the logic gate 1243. The synchronization circuit 1241 sends an acknowledgement 432 for the first enable signal 430 to the clock control circuit 122c, and the synchronization circuit 1242 sends an acknowledgement 422 for the second enable signal 420 to the driver circuit 128. The acknowledgements 432 and 422 may provide information regarding the state of the clock signal CLK (e.g., information indicating whether the clock signal CLK has an "on" state or an "off" state) to the clock control circuit 122c and the driver circuit 128, respectively.

The clock gating circuit 1244 is enabled or disabled by the output signal of the logic gate 1243 and thus outputs the short stopped clock signal SCLK. In other words, the clock gating circuit 1244 may be disabled after the driver circuit 128 receives the acknowledgement 412 from the clock control circuit 122c.

Figure 6:
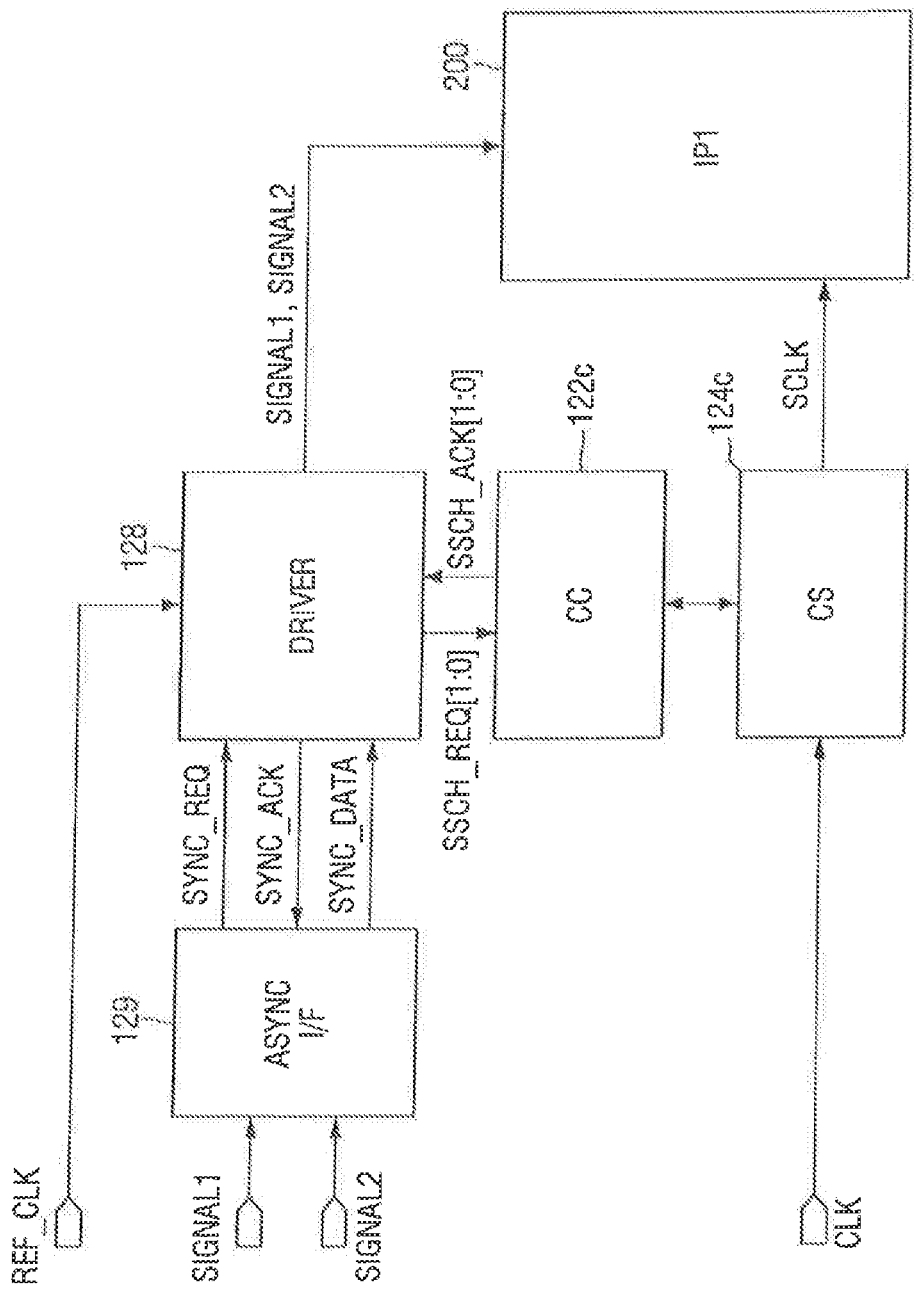
FIG. 6 is a schematic view illustrating a semiconductor device according to an exemplary embodiment of the present inventive concept.

FIG. 6 is a schematic view illustrating a semiconductor device according to an exemplary embodiment of the present inventive concept.

Referring to FIG. 6, the semiconductor device may further include an asynchronous interface 129 and a counter.

The asynchronous interface 129 is disposed at an input terminal of a driver circuit 128, converts an input asynchronous IP block control signal into a synchronous signal, and provides the synchronous signal to the driver circuit 128. In an exemplary embodiment of the present inventive concept, the asynchronous interface 129 receives an asynchronous first signal SIGNAL 1 and an asynchronous second signal SIGNAL 2, converts the asynchronous first signal SIGNAL 1 and the asynchronous second signal SIGNAL 2 into synchronous data SYNC_DATA, and provides the synchronous data SYNC_DATA to the driver circuit 128. To provide the synchronous data SYNC_DATA to the driver circuit 128, a request SYNC_REQ and an acknowledgement SYNC_ACK may be transmitted between the asynchronous interface 129 and the driver circuit 128.

The driver circuit 128 may provide a multi-bit first signal SIGNAL 1 and a multi-bit second signal SIGNAL 2 to an IP block 200. For example, if the multi-bit first signal SIGNAL 1 is m bits long (where m is a natural number) and the multi-bit second signal SIGNAL 2 is n bits long (where n is a natural number), the driver circuit 128 may provide the multi-bit first signal SIGNAL 1 and the multi-bit second signal SIGNAL 2 to the IP block 200 and may thus provide a total of (m+n) bits to the IP block 200.

In an exemplary embodiment of the present inventive concept, a clock request 410 that the driver circuit 128 sends to the clock control circuit 122c after detecting the input of an IP block control signal OS and a clock request 420 that the driver circuit 128 sends to a clock source 124c after ensuring that the clock source 124c receives a clock signal CLK from a clock source 124b may each be 2-bit data SSCH_REQ[1:0]. In addition, in an exemplary embodiment of the present inventive concept, an acknowledgement 412 for the clock request 410 and an acknowledgement 422 for the clock request 420 may each be 2-bit data SSCH_ACK [1:0].

The counter may be used to set the length of a short stopped clock signal SCLK. In other words, the counter may determine how many clocks elapse before and after the transition of an IP block control signal, which is transmitted according to the timing of the short stopped clock signal SCLK, in order to turn the clock signal CLK off.

Figure 7:
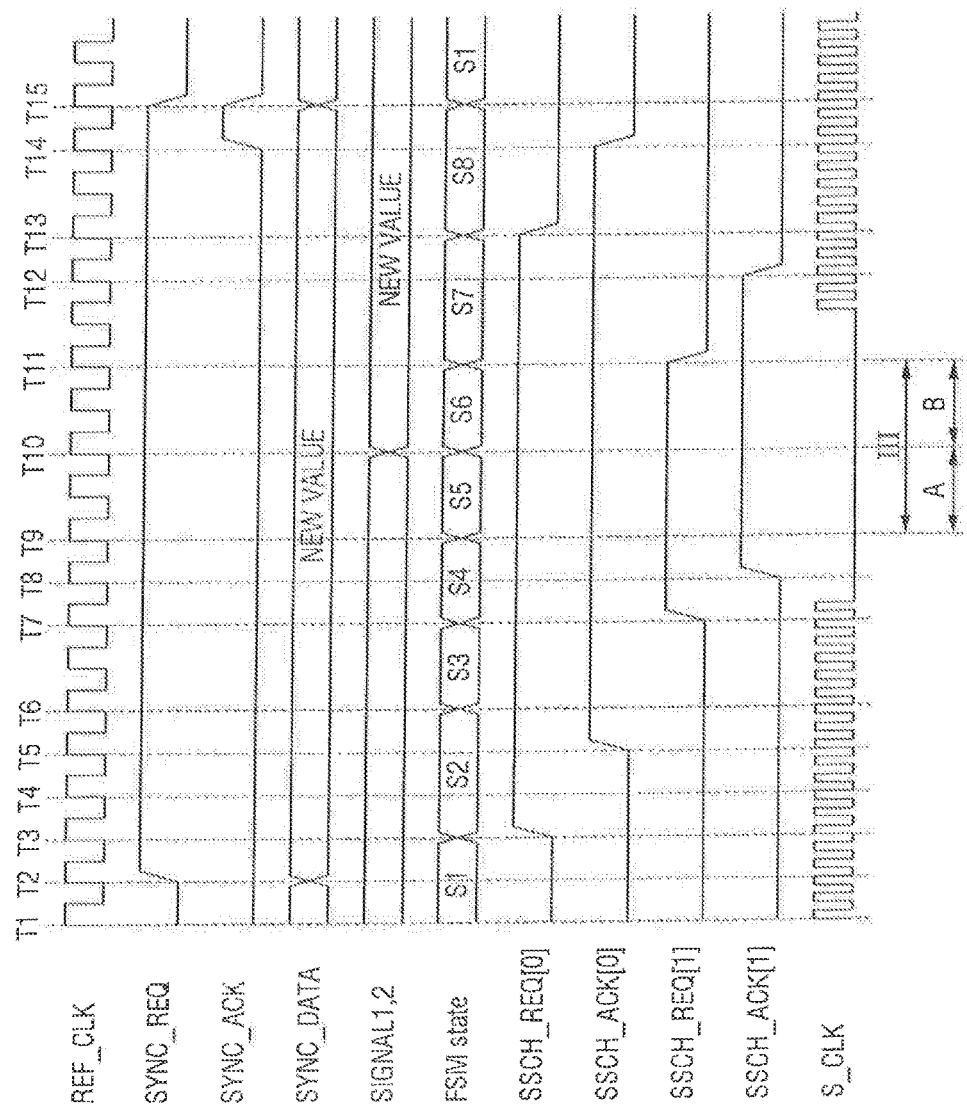
FIG. 7 is a timing diagram illustrating an operation of the semiconductor device of FIG. 6 according to an exemplary embodiment of the present inventive concept.

FIG. 7 is a timing diagram illustrating an operation of the semiconductor device of FIG. 6 according to an exemplary embodiment of the present inventive concept.

Referring to FIG. 7, at a time T2, the driver circuit 128 receives the synchronous data SYNC_DATA regarding the first and second asynchronous signals SIGNAL 1 and SIGNAL 2 from the asynchronous interface 129. During a period from a time T1 to a time T3, the driver circuit 128 has a first state S1, which is an idle state.

At the time T3, the driver circuit 128 sends a clock request SSCH_REQ[0] to the clock control circuit 122c to ensure that the clock signal CLK is provided from its parent. In response to the provision of the clock signal CLK to the clock source 124c, the driver circuit 128 receives an acknowledgement SSCH_ACK[0] from the clock control circuit 122c at a time T5. During a period from the time T3 to a time T6, the driver circuit 128 has a second state S2, which is for receiving the clock signal CLK from its parent.

During a period from the time T6 to a time T7, the driver circuit 128 waits in a third state S3. Then, at the time T7, the driver circuit 128 sends a clock request SSCH_REQ[1] to the clock source 124c. The clock source 124c generates the short stopped clock signal SCLK according to the clock request SSCH_REQ[1]. At a time T8, the driver circuit 128 receives an acknowledgement SSCH_ACK[1] from the clock source 124c. During a period from the time T7 to a time T9, the driver circuit 128 has a fourth state S4 and controls the generation of the short stopped clock signal SCLK.

The short stopped clock signal SCLK generated by the clock source 124c is output over a period from the time T9 to a time T11 (e.g., a period III), and at a time T10, the driver circuit 128 provides changed values (NEW VALUE) of the first and second asynchronous signals SIGNAL 1 and SIGNAL 2 to the IP block 200. Before the provision of the changed values of the first and second asynchronous signals SIGNAL 1 and SIGNAL 2, e.g., during a period A from the time T9 to the time T10, the driver circuit 128 has a fifth state S5, which is for counting the clock signal CLK. After the provision of the changed values of the first and second asynchronous signals SIGNAL 1 and SIGNAL 2, e.g., during a period B from the time T10 to the time T11, the driver circuit 128 has a sixth state S6, which is for counting the clock signal CLK. By counting the clock signal CLK, sufficient clock-off zones may be set before and after the first and second asynchronous signals SIGNAL 1 and SIGNAL 2.

At the time T11, the driver circuit 128 terminates the clock request SSCH_REQ[1], and the clock source 124c stops the generation of the short stopped clock signal SCLK. Then, at a time T12, the driver circuit 128 receives an acknowledgement SSCH_ACK[1]. During a period from the time T11 to a time T13, the driver circuit 128 has a seventh state S7, which is for stopping the generation of the short stopped clock signal SCLK.

At the time T13, the driver circuit 128 terminates the clock request SSCH_REQ[0]. At a time T14, the driver circuit 128 receives an acknowledgement SSCH_ACK[0] after the termination of a clock request associated with the parent of the clock control circuit 122c. During a period from the time T13 to a time T15, the driver circuit 128 has an eighth state S8, which is for terminating the clock request associated with the parent of the clock control circuit 122c.

Figure 8:
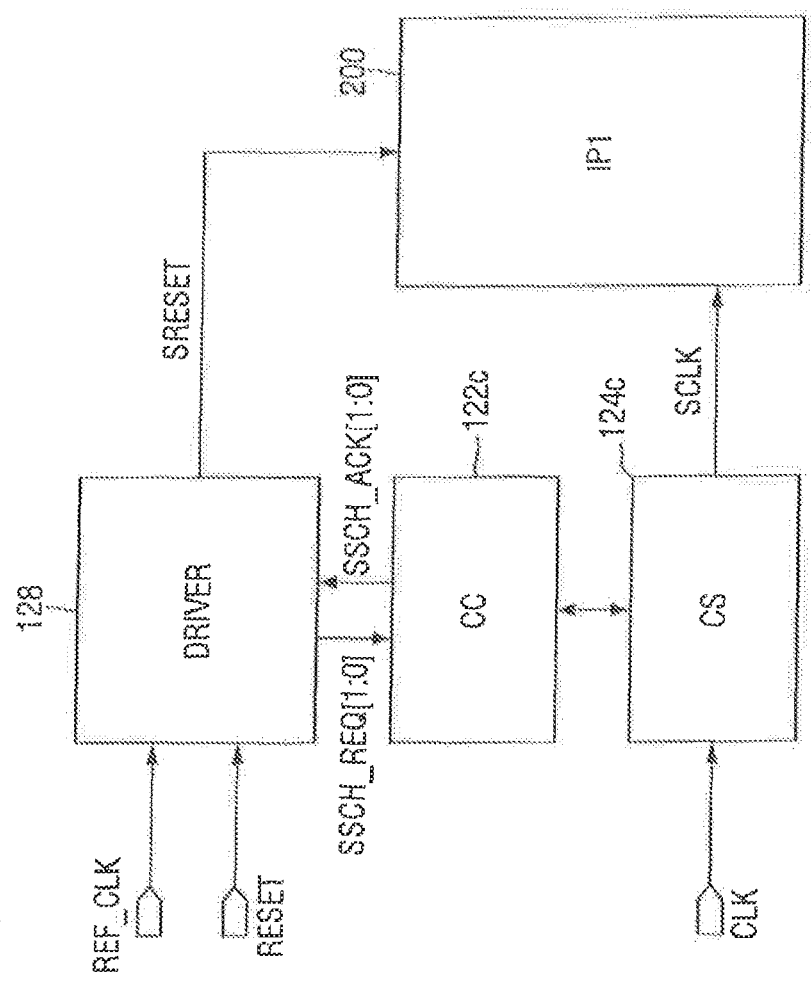
FIG. 8 is a schematic view illustrating a semiconductor device according to an exemplary embodiment of the present inventive concept.
Figure 9:
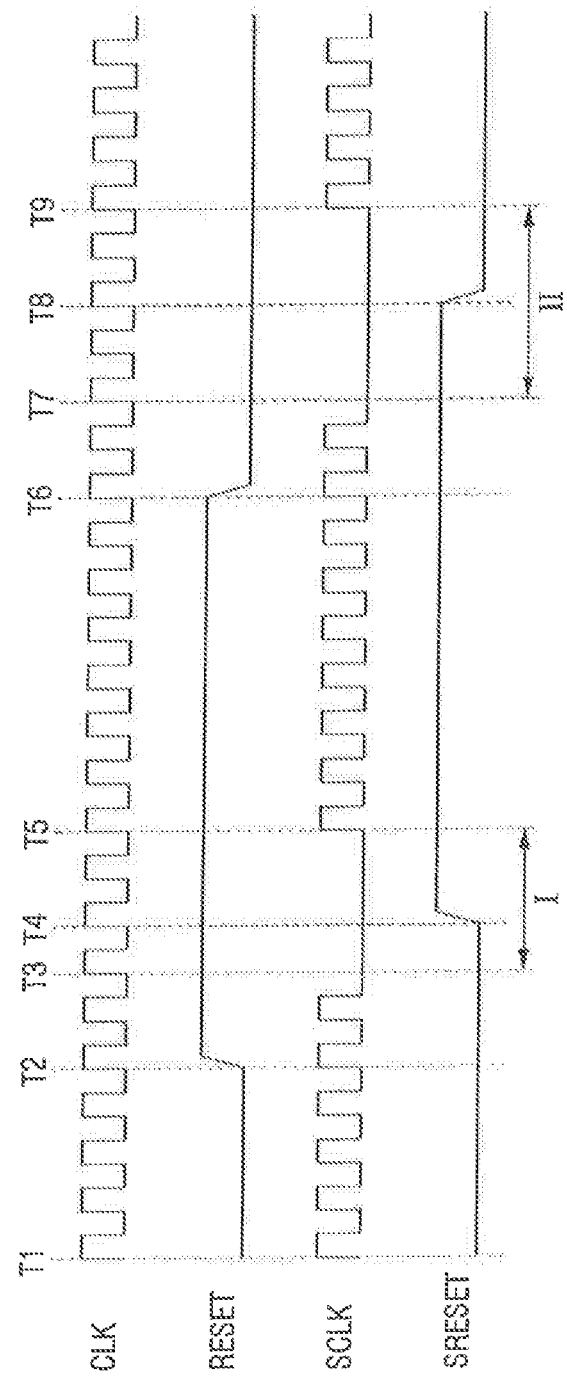
FIG. 9 is a timing diagram illustrating an operation of the semiconductor device of FIG. 8 according to an exemplary embodiment of the present inventive concept.

FIG. 8 is a schematic view illustrating a semiconductor device according to an exemplary embodiment of the present inventive concept, and FIG. 9 is a timing diagram illustrating an operation of the semiconductor device of FIG. 8 according to an exemplary embodiment of the present inventive concept.

Referring to FIGS. 8 and 9, a driver circuit 128 receives a reset signal RESET, which is for controlling an IP block 200, e.g., for resetting the IP block 200, and outputs the reset signal RESET as SRESET to the IP block 200 while a short stopped clock signal SCLK is output from a clock source 124c to the IP block 200.

For example, in response to the detection of the input of the reset signal RESET at a time T2 or T6, the driver circuit 128 sends a clock request SSCH_REQ[0] to a clock control circuit 122c. The clock control circuit 122c receives the clock request SSCH_REQ[0] and sends a clock request REQ to a parent clock control circuit so that the clock source 124c is provided with a clock signal CLK from the parent clock source. The clock control circuit 122c receives an acknowledgement ACK from the parent clock control circuit and sends an acknowledgement SSCH_ACK[0] for the clock request SSCH_REQ[0] to the driver circuit 128.

The driver circuit 128 receives the acknowledgement SSCH_ACK[0] for the clock request SSCH_REQ[0] from the clock control circuit 122c and sends a clock request SSCH_REQ[1] to the clock source 124c. The clock source 124c receives the clock request SSCH_REQ[1] and sends an acknowledgement SSCH_ACK[1] for the clock request SSCH_REQ[1] to the driver circuit 128 while outputting the short stopped clock signal SCLK in a period I from a time T3 to a time T5 or a period II from a time T7 to a time T9.

The driver circuit 128 transmits the reset signal SRESET to the IP block 200 at a time T4 or T8 according to the timing of the short stopped clock signal SCLK, which is output in the period I from the time T3 to the time T5 or the period II from the time T7 to the time T9.

Figure 10:
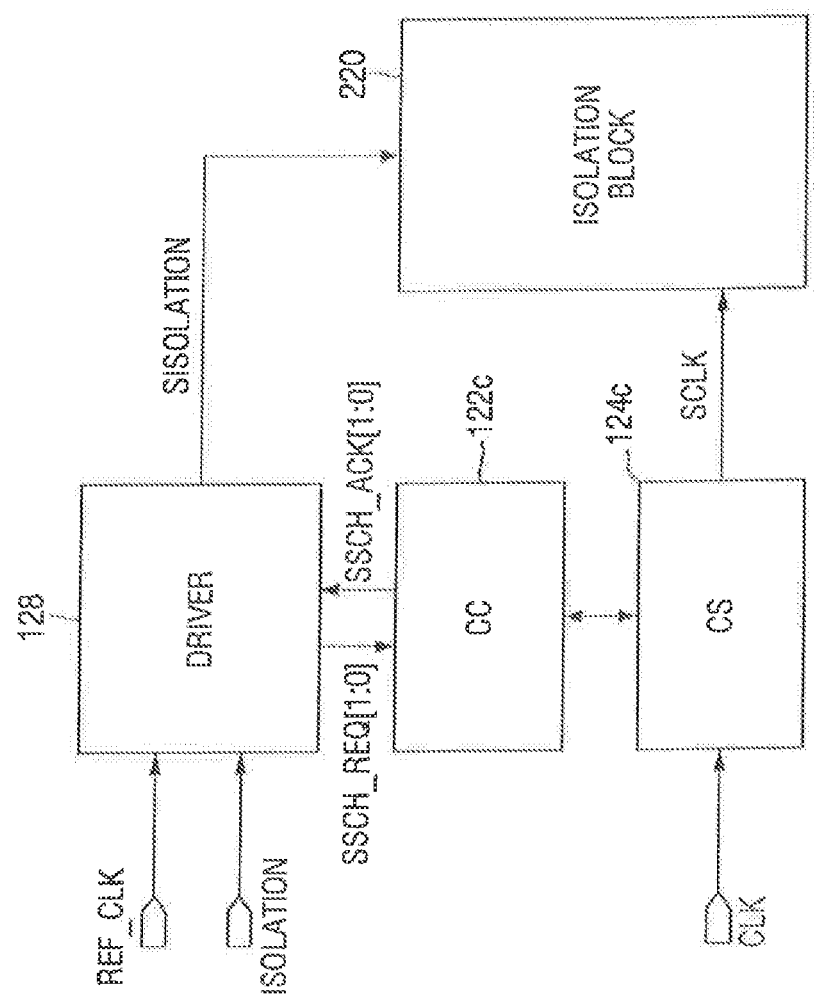
FIG. 10 is a schematic view illustrating a semiconductor device according to an exemplary embodiment of the present inventive concept.
Figure 11:
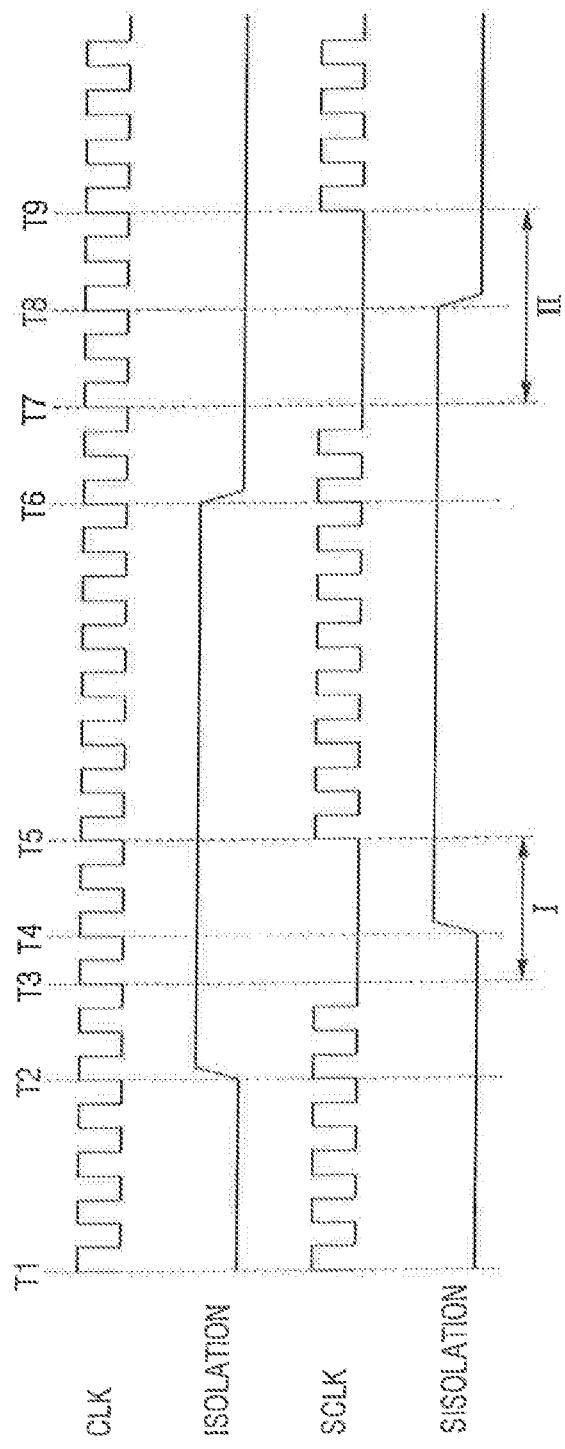
FIG. 11 is a timing diagram illustrating an operation of the semiconductor device of FIG. 10 according to an exemplary embodiment of the present inventive concept.

FIG. 10 is a schematic view illustrating a semiconductor device according to an exemplary embodiment of the present inventive concept, and FIG. 11 is a timing diagram illustrating an operation of the semiconductor device of FIG. 10 according to an exemplary embodiment of the present inventive concept.

Referring to FIGS. 10 and 11, a driver circuit 128 receives an isolation signal ISOLATION, which is for controlling an IP block 200, e.g., for isolating a part of the IP block 200, and outputs the isolation signal ISOLATION as SISOLATION to an isolation block 220 while a short stopped clock signal SCLK is output from a clock source 124c to the IP block 200.

For example, in response to the detection of the input of the isolation signal ISOLATION at a time T2 or T6, the driver circuit 128 sends a clock request SSCH_REQ[0] to a clock control circuit 122c. The clock control circuit 122c receives the clock request SSCH_REQ[0] and sends a clock request REQ to a parent clock control circuit so that the clock source 124c is provided with a clock signal CLK from the parent clock source. The clock control circuit 122c receives an acknowledgement ACK from the parent clock control circuit and sends an acknowledgement SSCH_ACK[0] for the clock request SSCH_REQ[0] to the driver circuit 128.

The driver circuit 128 receives the acknowledgement SSCH_ACK[0] for the clock request SSCH_REQ[0] from the clock control circuit 122c and sends a clock request SSCH_REQ[1] to the clock source 124c. The clock source 124c receives the clock request SSCH_REQ[1] and sends an acknowledgement SSCH_ACK[1] for the clock request SSCH_REQ[1] to the driver circuit 128 while outputting the short stopped clock signal SCLK in a period I from a time T3 to a time T5 or a period II from a time T7 to a time T9.

The driver circuit 128 transmits the isolation signal SISOLATION to the isolation block 220 at a time T4 or T8 according to the timing of the short stopped clock signal SCLK, which is output in the period I from the time T3 to the time T5 or the period II from the time T7 to the time T9.

Figure 12:
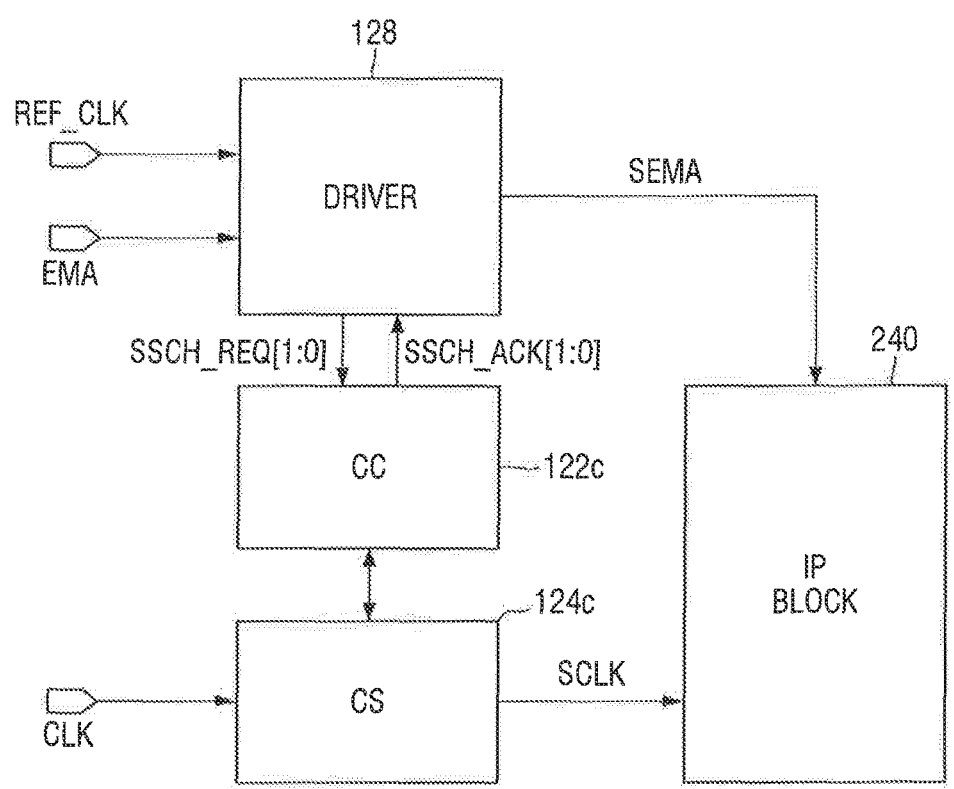
FIG. 12 is a schematic view illustrating a semiconductor device according to an exemplary embodiment of the present inventive concept.
Figure 13:
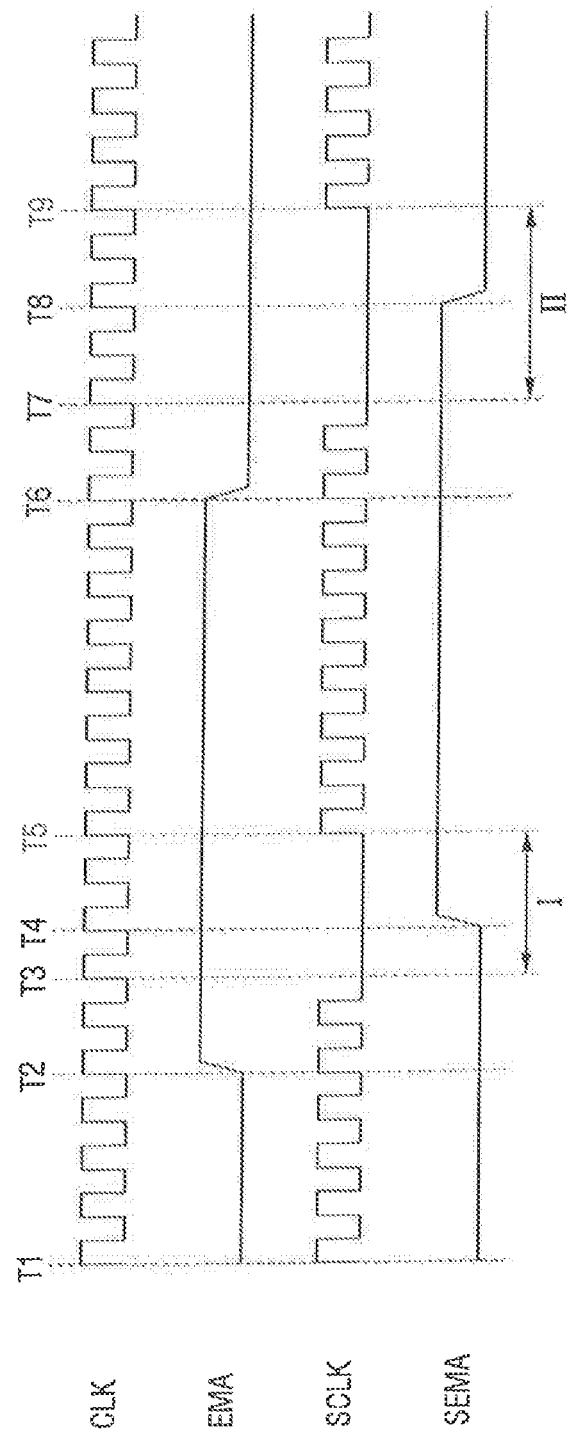
FIG. 13 is a timing diagram illustrating an operation of the semiconductor device of FIG. 12 according to an exemplary embodiment of the present inventive concept.

FIG. 12 is a schematic view illustrating a semiconductor device according to an exemplary embodiment of the present inventive concept, and FIG. 13 is a timing diagram illustrating an operation of the semiconductor device of FIG. 12 according to an exemplary embodiment of the present inventive concept.

Referring to FIGS. 12 and 13, a driver circuit 128 receives an EMA signal EMA, which is a signal for controlling a memory block, e.g., an IP block 240, e.g., for resetting the IP block 240, and outputs the EMA signal EMA as SEMA to the IP block 240 while a short stopped clock signal SCLK is output from a clock source 124c to the IP block 240.

For example, in response to the detection of the input of the EMA signal EMA at a time T2 or T6, the driver circuit 128 sends a clock request SSCH_REQ[0] to a clock control circuit 122c. The clock control circuit 122c receives the clock request SSCH_REQ[0] and sends a clock request REQ to a parent clock control circuit so that the clock source 124c is provided with a clock signal CLK from the parent clock source. The clock control circuit 122c receives an acknowledgement ACK from the parent clock control circuit and sends an acknowledgement SSCH_ACK[0] for the clock request SSCH_REQ[0] to the driver circuit 128.

The driver circuit 128 receives the acknowledgement SSCH_ACK[0] for the clock request SSCH_REQ[0] from the clock control circuit 122c and sends a clock request SSCH_REQ[1] to the clock source 124c. The clock source 124c receives the clock request SSCH_REQ[1] and sends an acknowledgement SSCH_ACK[1] for the clock request SSCH_REQ[1] to the driver circuit 128 while outputting the short stopped clock signal SCLK in a period I from a time T3 to a time T5 or a period II from a time T7 to a time T9.

The driver circuit 128 transmits the EMA signal SEMA to the IP block 240 at a time T4 or T8 according to the timing of the short stopped clock signal SCLK, which is output in the period I from the time T3 to the time T5 or over the period II from the time T7 to the time T9.

Figure 14:
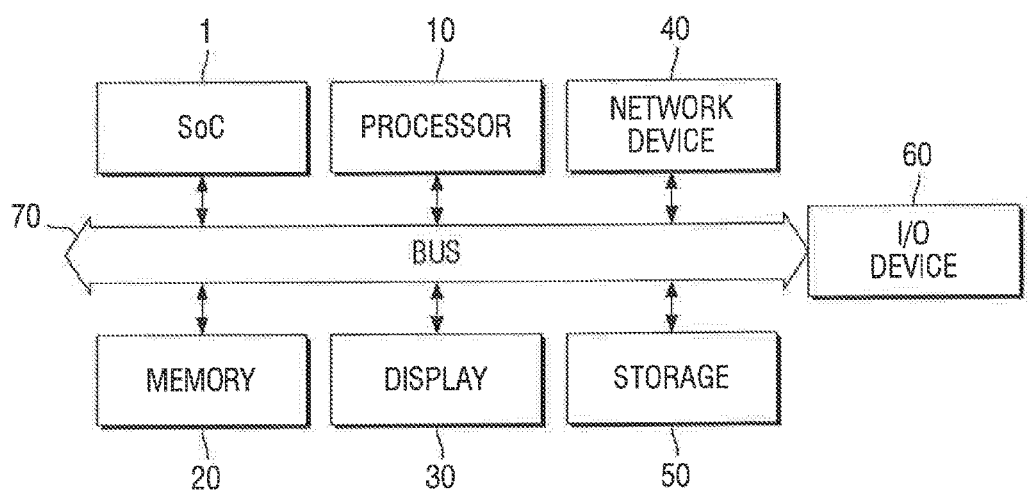
FIG. 14 is a block diagram illustrating a semiconductor system to which a semiconductor device according to an exemplary embodiment of the present inventive concept and an operating method of a semiconductor device according to an exemplary embodiment of the present inventive concept are applicable.

FIG. 14 is a block diagram of a semiconductor system to which a semiconductor device according to an exemplary embodiment of the present inventive concept and an operating method of a semiconductor device according to an exemplary embodiment of the present inventive concept are applicable.

Referring to FIG. 14, the semiconductor system may include a semiconductor device "SoC" 1, a processor 10, a memory device 20, a display device 30, a network device 40, a storage device 50, and an input/output (I/O) device 60. The semiconductor device "SoC" 1, the processor 10, the memory device 20, the display device 30, the network device 40, the storage device 50, and the I/O device 60 may exchange data with one another via a bus 70.

The semiconductor device "SoC" 1 may include at least one of a memory controller, which controls the memory device 20, a display controller, which controls the display device 30, a network controller, which controls the network device 40, a storage controller, which controls the storage device 50, and an I/O controller, which controls the I/O device 60. The semiconductor system may further include an additional processor, which controls at least one of the memory device 20, the display device 30, the network device 40, the storage device 50, and the I/O device 60.

Figure 15:
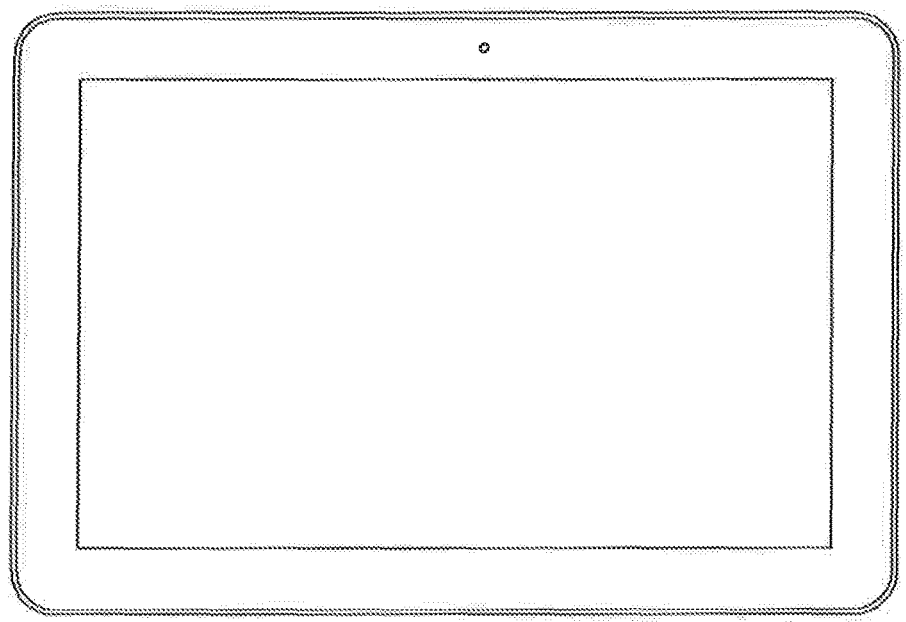
FIGS. 15, 16 and 17 are schematic views illustrating examples of the semiconductor system of FIG. 14.
Figure 16:
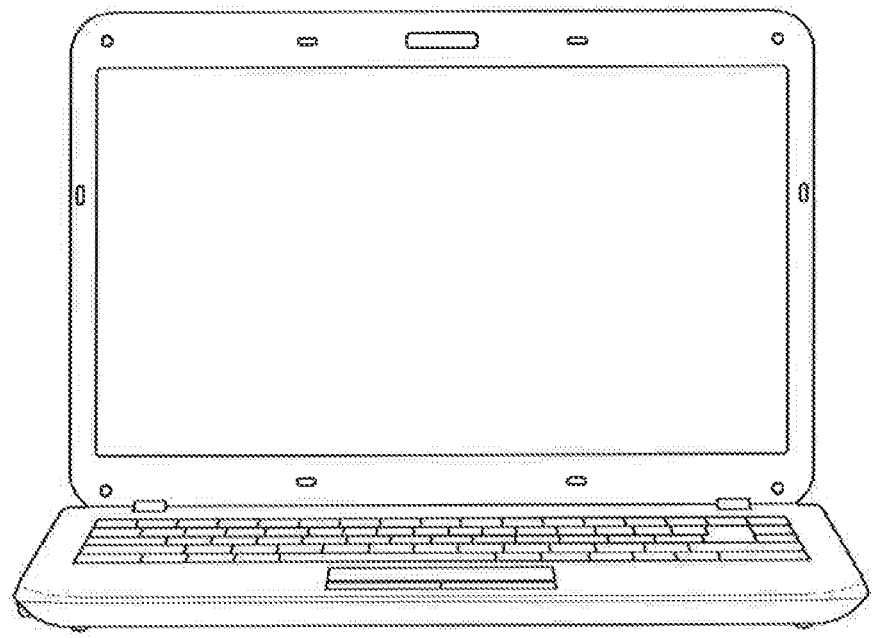
Figure 17:
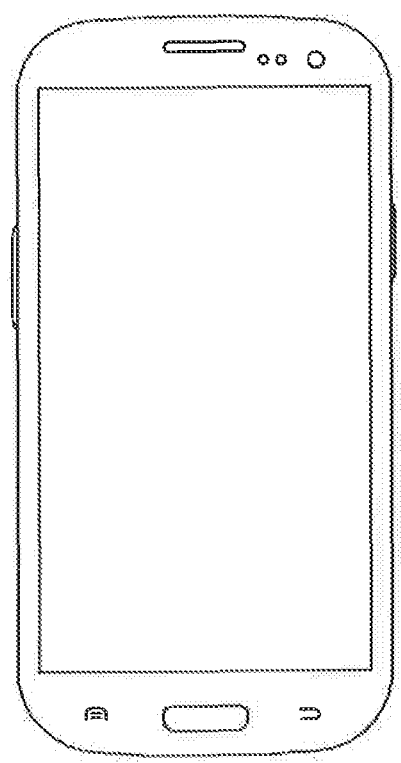

FIGS. 15, 16 and 17 are schematic views illustrating examples of the semiconductor system of FIG. 14.

For example, FIG. 15 illustrates a tablet personal computer (PC) 1200, FIG. 16 illustrates a notebook computer 1300, and FIG. 17 illustrates a smartphone 1400. A semiconductor device according to an exemplary embodiment of the present inventive concept may be used in the tablet PC 1200, the notebook computer 1300, or the smartphone 1400.

In addition, the semiconductor device according to an exemplary embodiment of the present inventive concept may also be used in various integrated circuit (IC) devices other than those set forth herein.

In addition, the semiconductor system to which an exemplary embodiment of the present inventive concept is applicable may also be a computer, an ultra mobile PC (UMPC), a work station, a net-book computer, a personal digital assistant (PDA), a portable computer, a wireless phone, a mobile phone, an electronic-book (e-book), a portable multimedia player (PMP), a portable game console, a navigation device, a black box, a digital camera, a 3-dimensional (3D) television set, a digital audio recorder, a digital audio player, a digital picture recorder, a digital picture player, a digital video recorder, or a digital video player.

An exemplary embodiment of the present inventive concept provides a semiconductor device for implementing a short stopped clock signal in a system where a clock signal control is implemented by hardware.

An exemplary embodiment of the present inventive concept provides a semiconductor system for implementing a short stopped clock signal in a system where a clock signal control is implemented by hardware.

An exemplary embodiment of the present inventive concept provides a method of operating a semiconductor device for implementing a short stopped clock signal in a system where a clock signal control is implemented by hardware.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A semiconductor device, comprising:
a driver circuit;
a first clock control circuit for controlling a first clock source;
a second clock control circuit for sending a first clock request to the first clock control circuit in response to a second clock request from the driver circuit, and controlling a second clock source to generate a stopped clock signal based on an acknowledgment of the first clock request from the first clock control circuit, wherein the second clock source receives a clock signal from the first clock source, and the stopped clock signal is a clock signal turned off for a predetermined amount of time; and
wherein the driver circuit receives an intellectual property (IP) block control signal, and outputs the IP block control signal to an IP block while the stopped clock signal is output to the IP block.

2. The semiconductor device of claim 1, wherein in response to the IP block control signal, the driver circuit sends the second clock request to the second clock control circuit.

3. The semiconductor device of claim 2, wherein the driver circuit receives an acknowledgement for the second clock request from the second clock control circuit.

4. The semiconductor device of claim 3, wherein in response to the acknowledgement for the second clock request from the second clock control circuit, the driver circuit sends a third clock request to the second dock source.

5. The semiconductor device of claim 4, wherein the driver circuit receives an acknowledgement for the third clock request from the second clock source, and then, outputs the IP block control signal to the IP block.

6. The semiconductor device of claim 1, wherein the IP block control signal includes a reset signal, an isolation signal, or an extra-margin adjustment (EMA) signal for a memory device.

7. The semiconductor device of claim 1, wherein the second clock source includes a clock gating circuit.

8. The semiconductor device of claim 7, wherein the second clock source further includes a logic gate, which performs a logic operation on a first enable signal received from the second clock control circuit and a second enable signal received from the driver circuit and as a result of the logic operation outputs a signal for controlling the clock gating circuit.

9. The semiconductor device of claim 8, wherein the clock gating circuit is enabled or disabled by the signal output from the logic gate.

10. The semiconductor device of claim 1, wherein the second clock control circuit or the second clock source further includes a counter, which sets a length of the stopped dock signal.

11. A semiconductor device, comprising:
a driver circuit;
a first clock control circuit for controlling a first clock source;
a second clock control circuit for sending a first clock request to the first clock control circuit in response to a second clock request from the driver circuit, and controlling a second clock source to generate a stopped clock signal based on an acknowledgment of the first clock request from the first clock control circuit, wherein the second clock source receives a clock signal from the first clock source, and the stopped clock signal is a clock signal turned off for a predetermined amount of time;
wherein the driver circuit sends the second clock request to the second clock circuit and sends a third clock request to the second clock source in response to an intellectual property (IP) block control signal; and
wherein the driver circuit outputs the IP block control signal to an IP block while the stopped clock signal is output to the IP block.

12. The semiconductor device of claim 11, wherein the driver circuit receives an acknowledgement for the second clock request from the second clock control circuit, and then, sends the third clock request to the second clock source.

13. The semiconductor device of claim 12, wherein the driver circuit receives an acknowledgement for the third clock request from the second clock source and outputs the IP block control signal to the IP block.

14. The semiconductor device of claim 11, wherein the IP block control signal includes a reset signal, an isolation signal, or an extra-margin adjustment (EMA) signal for a memory device.

15. The semiconductor device of claim 11, wherein the second clock source includes a clock gating circuit.

16. The semiconductor device of claim 15, wherein the second clock source further includes a logic gate, which performs a logic operation on a first enable signal received from the second clock control circuit and a second enable signal received from the driver circuit and as a result of the logic operation outputs a signal for controlling the clock gating circuit.

17. The semiconductor device of claim 16, wherein the clock gating circuit is enabled or disabled by the signal output from the logic gate.

18. The semiconductor device of claim 11, wherein the second clock control circuit or the second clock source further includes a counter, which sets a length of the stopped clock signal.

19. A semiconductor device comprising:
a clock control circuit and a clock source; and
a driver circuit configured to send a first clock request signal at a first time to the clock control circuit, receive an acknowledgement of the first clock request at a second time, send a second clock request at a third time to the clock source, and receive an acknowledgement of the second clock request at a fourth time,
wherein the clock control circuit provides an enable signal to the clock source upon receiving the first clock request signal, and the clock control circuit provides the acknowledgment of the first clock request to the driver circuit upon receiving an acknowledgment of the enable signal from the clock source;
wherein the clock source is configured to generate a first clock signal in response to the second clock request, wherein the first clock signal does not oscillate between a high and a low state,
wherein the driver circuit is further configured to terminate the second clock request at a fifth time and, in response to terminating the second clock request, the first clock signal is disabled, and
wherein the driver circuit outputs a control signal to an intellectual property (IP) block while the first control signal that does not oscillate is output from the clock source.

20. The semiconductor device of claim 19, wherein when the first dock signal is disabled a second clock signal that oscillates between the high and low states is output from the clock source.

* * * * *